United States Patent [19]

Oelsch et al.

[11] Patent Number: 5,144,567
[45] Date of Patent: Sep. 1, 1992

[54] PROGRAMMABLE PLUG AND CABLE FOR COMPUTER KEYBOARDS

[75] Inventors: Jürgen Oelsch, Hohenroth; Gerhard Hochgesang, Bad Neustadt/Saale; Rudolf Limpert, Salz; Dieter Weber, Stockheim, all of Fed. Rep. of Germany

[73] Assignee: Preh-Werke GmbH & Co. KG, Bad Neustadt/saale, Fed. Rep. of Germany

[21] Appl. No.: 315,927

[22] Filed: Feb. 27, 1989

[30] Foreign Application Priority Data

Feb. 26, 1988 [DE] Fed. Rep. of Germany ... 8802507[U]

[51] Int. Cl.$^5$ .................. G06F 3/023; H03M 11/00
[52] U.S. Cl. .................. 364/708; 364/709.09; 341/22; 341/23
[58] Field of Search .................. 341/22, 23, 26; 364/708, 709.01, 200, 900, 709.10, 709.09, 709.12

[56] References Cited

U.S. PATENT DOCUMENTS

| | | | |
|---|---|---|---|
| 3,706,973 | 12/1972 | Acquadro et al. | 364/900 |
| 3,760,375 | 9/1973 | Irwin et al. | 364/200 |
| 4,156,928 | 5/1979 | Inose et al. | 364/900 |
| 4,200,913 | 4/1980 | Kuhar et al. | 364/900 |
| 4,404,551 | 9/1983 | Howse et al. | 364/146 |
| 4,441,164 | 4/1984 | Pavan et al. | 364/900 |
| 4,456,972 | 6/1984 | Lee et al. | 364/900 |
| 4,459,581 | 7/1984 | Wilson et al. | 341/26 |
| 4,481,587 | 11/1984 | Daniels, Jr. | 364/464.03 |
| 4,527,250 | 7/1985 | Galdun et al. | 364/900 |
| 4,567,556 | 1/1986 | Onogi et al. | 364/140 |
| 4,641,262 | 2/1987 | Bryan et al. | 364/900 |
| 4,688,020 | 8/1987 | Kuehneman et al. | 341/23 |
| 4,692,870 | 9/1987 | Manduley | 364/900 |
| 4,763,252 | 8/1988 | Rose | 364/200 |
| 4,779,079 | 10/1988 | Hauck | 364/900 |
| 4,823,311 | 4/1989 | Hunter et al. | 364/900 |
| 4,853,888 | 8/1989 | Lata et al. | 364/900 |
| 4,868,780 | 9/1989 | Stern | 364/900 |
| 4,937,778 | 6/1990 | Wolf et al. | 364/900 |
| 4,964,075 | 10/1990 | Shaver et al. | 364/900 |

FOREIGN PATENT DOCUMENTS

| | | |
|---|---|---|
| 0047078 | 8/1981 | European Pat. Off. . |
| 0093509 | 4/1983 | European Pat. Off. . |
| 0251477 | 5/1987 | European Pat. Off. . |

OTHER PUBLICATIONS

Preh Commander 1.308.

*Primary Examiner*—Gareth D. Shaw
*Assistant Examiner*—Matthew C. Fagan
*Attorney, Agent, or Firm*—Fish & Richardson

[57] ABSTRACT

A data input device for an electronic data processing device such as a personal computer includes an input keyboard, which has a key field, a casing and a plug-in receptacle for a keyboard plug on a circuit connector; and a connector, such as a junction cable, which has a keyboard plug which fits into the receptacle on the keyboard, a circuit connector which is a connection wire, a plug at the end of the connection wire connecting with the electronic data processing device, and programmable encoder electronics for encoding unique signals corresponding to each key in the key field on the keyboard. A portion of the encoder electronics, in which the program relating the keyboard to the electronic data processing device is encoded, is located within the keyboard plug and not within the keyboard itself.

9 Claims, 3 Drawing Sheets

PROGRAMMABLE PLUG AND CABLE FOR COMPUTER KEYBOARDS

BACKGROUND OF THE INVENTION

The invention relates to a data input device for an electric data processing device, consisting of an input keyboard comprising a key field, a casing and a plug-in connection, a circuit connector comprising a connection wire, a keyboard plug and a plug connecting with the data processing device, and programmable encoder electronics.

Today such data input devices are used for example in commerce, industry, postal services or for private purposes, among other things in connection with PCs. Their respective encoder electronics coordinate the key code with the code of the corresponding data processing device. The well-known multifunctional input keyboard of the system PS/2 by IBM is provided with encoder electronics in the input keyboard and a plug-in connection. Another input keyboard with encoder electronics is shown in the leaflet "Preh Commander" 1.308 by the firm Preh.

If the computer of a data processing device is exchanged or, what happens more frequently, a keyboard is replaced, often the code of the data input device has to be adapted to the code system of the corresponding data processing device. The adaption is acheived by operations in the encoder electronics.

If the function of a key of a keyboard is to be transferred to another key, for example with respect to its application, this is achieved by operations in the encoder electronics, too, unless the data processing device renders possible such a transfer in a different way. EP 0 047 078 shows by the example of a calculator that reprogramming is possible by means of magnetic cards that can be inserted into the device. Such magnetic cards, however, require special transfer devices.

In the prior art the encoder electronics are arranged within the input keyboard. If an operation in the encoder electronics is necessary, the casing box of the keyboard has to be opened, the electronic element required, for example, for reprogramming, is to be removed out of its place in the circuit and to be treated in a programming device. Then the electronic element is reinserted into the circuit, and finally the casing box of the keyboard casing is closed again. In general, only the producer, seldom the distributor, can carry out such an operation; the operation is complicated and endangers quality.

In order to avoid the complexity of reprogramming and the endangering of quality, a plurality of different data input devices has to be produced and stored corresponding to the plurality of common data processing systems and fields of application. This is not very rational, ties up a lot of money and requires a high storing capacity.

SUMMARY OF THE INVENTION

It is therefore an object of the invention to provide a data input device of the above type that can be standardized in production as well as in storage and that can be adapted to the requirements of the respective application in business without the help of an expert.

According to the invention, this problem is solved by arranging in the plug at least the part of the encoder electronics which determines the program separate from the input keyboard.

The invention is based on the idea of removing the encoder electronics out of the expensive keyboard and relating it to a different, if possible already existing, at any rate less expensive, element which can be handled as a separate part independently from the voluminous keyboard. This part is provided by a pluggable circuit connector in which the encoder electronics is integrated. Such a plug-in circuit connector is cheaper than the complete data input device, it requires less storeroom and it can be thus favourably used for the provision of a plurality of differently programmed encoders. In addition, the invention leads to a standard input keyboard that can be produced rationally and is equally suitable for a plurality of different encoder programs, e.g., a multifunctional keyboard with 101 input keys. If the encoder electronics, at least the part determining the program, are arranged in the keyboard plug of the circuit connector, no specific encoder casing is required.

Depending on the equipment, the encoder electronics comprise, for example, erasable memory ICs or driver ICs partially integrated in microprocessors or microcomputers, clock generators, peripheral diodes, capacitors and resistors. With the concentration and minuteness of elements achieved today the installation of the encoder electronics in the casing of the keyboard plug does not cause any difficulties.

If the encoder electronics is provided with an EPROM or EEPROM as erasable program memory, it can be favourably produced and stored as a standard product. The application-oriented programming is carried out upon delivery to the user, for example.

If the IC connections for the programming of the encoder electronics are suitably connected with the wall plug of the keyboard plug, the re- or post-programming can be easily carried out by means of these wall plugs. The separation of the encoder electronics from the other circuits of the device already takes place when the plugs of the circuit connector are pulled out. Its connections are plugged into a corresponding programming unit and the encoder electronics are programmed as desired without opening the keyboard plug.

Thus, with this invention the complete data input device, i.e. the input keyboard as well as the circuit connector and the encoder electronics, can be favourably produced and stored independently from the application. The producer or the distributor programs or reprograms, respectively, the encoder electronics of the data input device easily and quickly according to the requirements of the user by means of a programming device. For this purpose the encoder electronics are taken from the considerably reduced, standardized supply and programmed in view of the intended application before being handed over to the user.

In an embodiment of the invention the keyboard plug is simplified. The marginal section of the printed circuit serves as a plug-in contact. A further embodiment simplifies the erasure of a program stored in an IC, e.g., an EPROM, by providing the plug-in part or the keyboard plug, respectively, with a closable opening oriented at the EPROM of the encoder electronics. This does not require the removal of the IC; it can be soldered on the printed circuit board.

In the following an embodiment of the invention is explained by means of drawings.

DETAILED DESCRIPTION OF THE INVENTION

Figure 1:
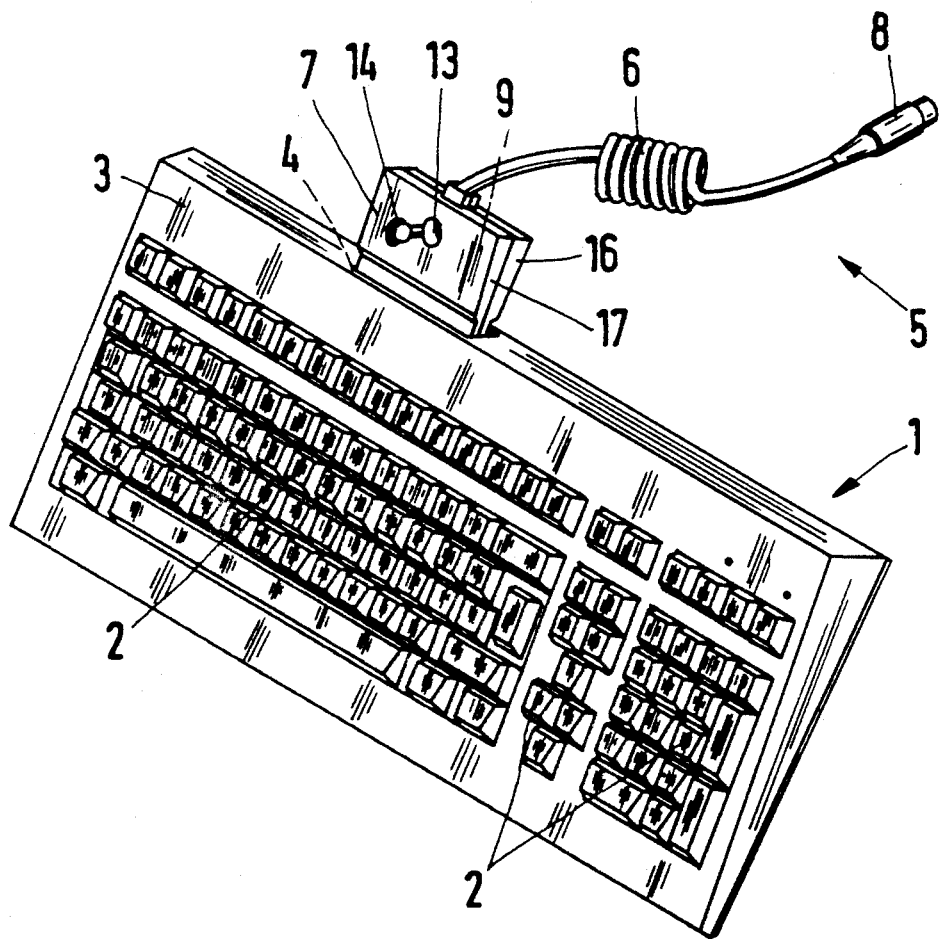
FIG. 1 shows an overall view of the data input device according to the invention with pluggable circuit connector.

The data input device according to FIG. 1 has an input keyboard 1 with a casing 3 and several key fields 2 arranged in the casing 3. At the casing 3 there is a plug-in connection 4 where the connection lines of the key matrix of the key fields 2 end. A circuit connector 5 electrically connects the input keyboard 1 with a data processing device (not shown). The circuit connector 5, with a junction cable 6, a keyboard plug 7 for the input keyboard 1 and a connection plug 8 for the data processing device, is plugged with its keyboard plug 7 into the plug-in connection 4 of the input keyboard 1 and connects the input keyboard 1 and the circuit connector 5 electrically.

According to the invention, in FIG. 1 the encoder electronics 9 are arranged in the keyboard plug 7.

Figure 2:
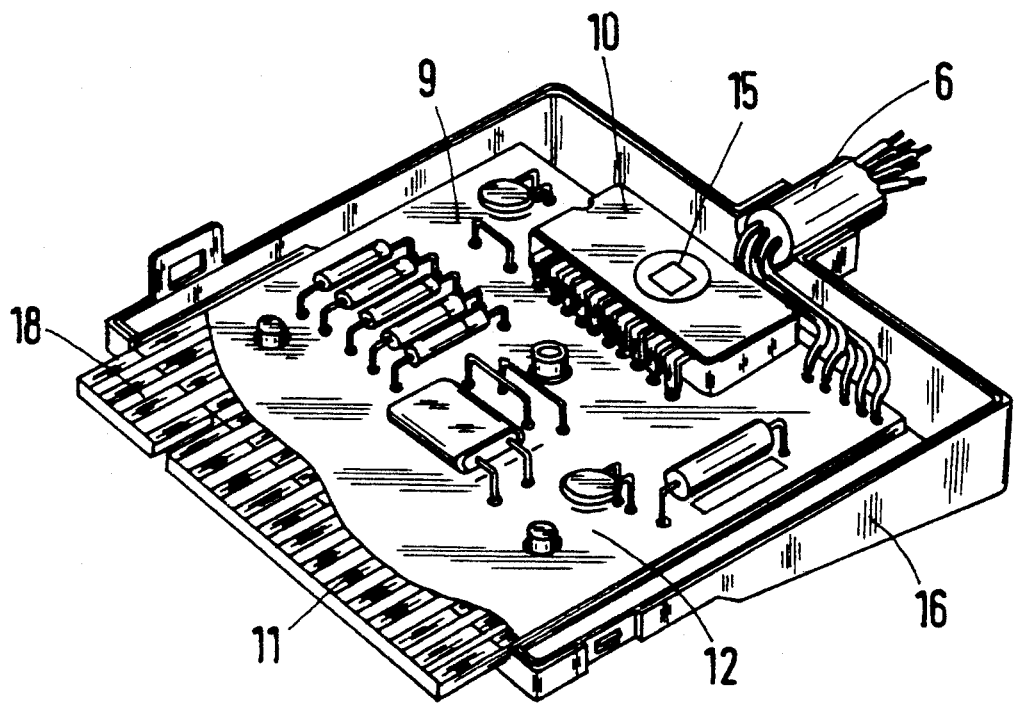
FIG. 2 shows an enlarged view of a semicapsule of the keyboard plug of the data input device with the encoder electronics.

FIG. 2 shows a semicapsule 16 of the opened keyboard plug 7 of FIG. 1. Within the semicapsule 16 a printed circuit 12 with the wiring and elements of the encoder electronics circuit 9 is arranged. The printed circuit 12 extends beyond the semicapsule 16 into section 18. In this section 18 the ends 11 of the wiring of the printed circuit 12 are formed as wall plugs 11 arranged in the basic grid. If the keyboard plug 7 is plugged into the plug-in connection 4 of the input keyboard 1, the wall plugs 11 are electrically connected with the corresponding connection ends of the key matrix of the key fields 2. In addition to further elements the encoder electronics comprise as the programmable IC a microcomputer 10 with integrated EPROM; the MC68705P by Motorola is an example for such a microcomputer. The other semicapsule 17 of the keyboard plug 7 comprises an opening 13 which is oriented at the window 15 of the integrated EPROM and is closed by means of a cap 14.

Figure 3:
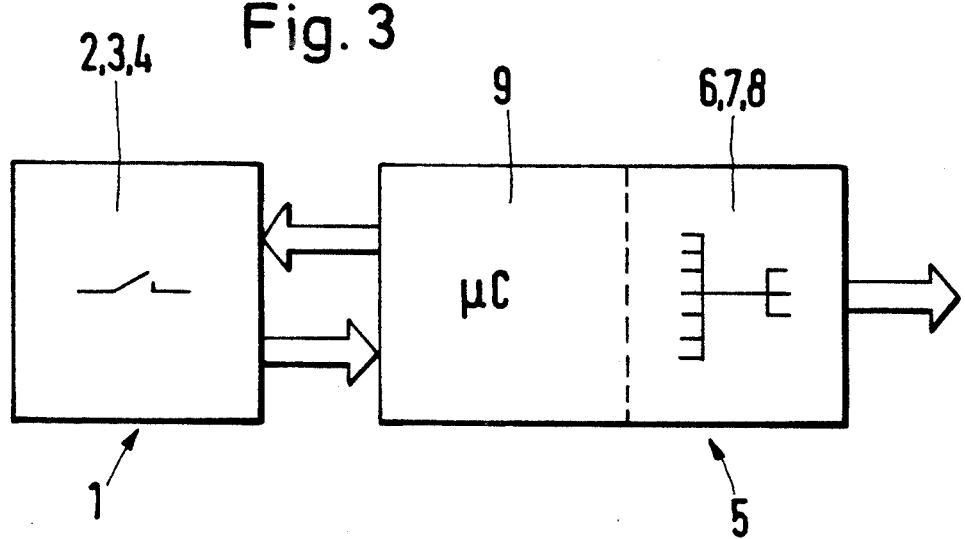
FIG. 3 shows a diagrammatic view of the structure of the data input device according to FIG. 1.
Figure 4:
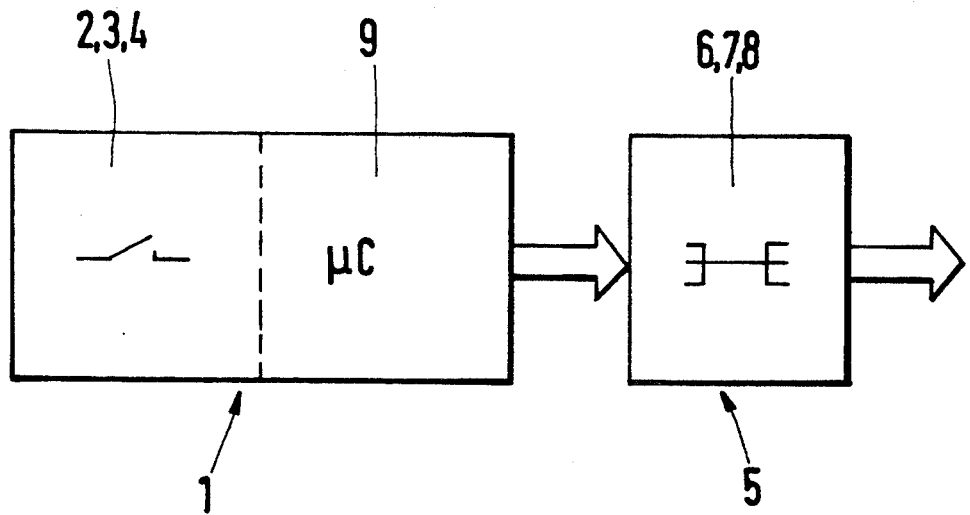
FIG. 4 shows a prior art device in comparison with FIG. 3.

FIG. 3 shows a diagrammatic view of the structure of a data input device according to the invention. FIG. 4 shows a prior art device in comparison with FIG. 3. At the interface of input keyboard 1 and circuit connectors 4, 7 the number of required wall plugs rises in comparison with the prior art by removing the encoder electronics 9 out of the input keyboard 1.

If a data input device is to be programmed or reprogrammed, only the circuit connector 5 need be handled. After having removed the wall plugs 7, 8 out of their operating position and after having opened the cap 14 of the keyboard plug 7, the window 15 of the electronic memory 10 is exposed to UV radiation through the opening 13 in the semicapsule 17 of the keyboard plug 7. The radiation neutralizes the memory content of the EPROM 10. Then the keyboard plug 7 with its contacts 11 is plugged into a corresponding receptacle of a programming device (not shown) and the encoder electronics 9 are programmed by the device after the starting thereof. The circuit connector 5 is removed out of the programming device and reinstalled in its operating position; the key code encoded according to the new program of the encoder electronics 9 is applied to the data processing device.

The producer provides unprogrammed circuit connectors 5 from the standardized supply and programs them upon delivery according to the instructions of the client in an application-oriented way. In this situation the erasure of the EPROM 10 is unnecessary. The manufacturer can rationally produce a standard input keyboard 1 without taking the later application into consideration.

What is claimed is:

1. A data input device for an electronic data processing device comprising:
    an input keyboard without keyboard encoder electronics comprising a key field including a plurality of keys, a casing and a plug-in receptacle for a keyboard plug; and
    means for connecting the input keyboard to the electronic data processing device, said means for connecting comprising:
    the keyboard plug, a circuit connector comprising a connection wire, a plug at an end of the connection wire connecting with the electronic data processing device, and programmable encoder electronics, located within the keyboard plug, for encoding unique signals corresponding to each key in the key field on the keyboard,
    said encoder electronics, comprising a reprogrammable program memory in which is encoded a program relating the keyboard and the electronic data processing device.

2. The data input device according to claim 1, wherein connecting terminals of the reprogrammable program memory are connected with wall plugs of the keyboard plug.

3. The data input device according to claim 2, wherein the wall plugs of the keyboard plug are part of a printed circuit.

4. A junction cable for connecting an input keyboard having keys with a personal computer, comprising:
    a keyboard plug which comprises a capsule which is configured on its exterior to mate with a receptacle on the input keyboard, a connection wire connected at one end to the keyboard plug, a plug at the other end of the connection wire connecting with the personal computer, and a UV-erasable reprogrammable IC as reprogrammable program memory, located within the capsule of the keyboard plug, for encoding unique signals corresponding to each of the keys of the input keyboard, said keyboard plug having an opening therein which is closable by a cap located above a window in the UV-erasable reprogrammable IC.

5. The junction cable according to claim 4, wherein connecting terminals of the UV-erasable reprogrammable IC are connected with wall plugs of the keyboard plug.

6. The junction cable according to claim 5, wherein the wall plugs of the keyboard plug are part of a printed circuit.

7. A data input device for an electronic data processing device comprising:
    an input keyboard comprising a key field including a plurality of keys, a casing and a plug-in receptacle for a keyboard plug; and means for connecting the input keyboard to the electronic data processing device, said means for connecting comprising:

the keyboard plug, a circuit connector comprising a connection wire, a plug at an end of the connection wire connecting with the electronic data processing device, and programmable encoder electronics for encoding unique signals corresponding to each key in the key field on the keyboard, said keyboard plug comprising at least a portion of the encoder electronics, which portion comprises a UV-erasable IC as a reprogrammable program memory in which is encoded a program relating the keyboard and the electronic data processing device, keyboard plug having an opening therein which is closable by a cap located above a window in the UV-erasable reprogrammable IC.

8. The data input device according to claim 7, wherein connecting terminals of the UV-erasable reprogrammable IC are connected with wall plugs of the keyboard plug.

9. The data input device according to claim 8, wherein the wall plugs of the keyboard plug are part of a printed circuit.

* * * * *